United States Patent [19]
Jagschitz

[11] Patent Number: 4,725,762
[45] Date of Patent: Feb. 16, 1988

[54] CIRCUIT SUPPLIED WITH DIRECT VOLTAGE FOR GENERATING VOLTAGES AND/OR CURRENTS WITH DIFFERENT CURVE FORM AND/OR DIFFERENT FREQUENCY AND/OR DIFFERENT POLARITY WITH AT LEAST ONE LOAD

[75] Inventor: Otto Jagschitz, Götzis, Austria

[73] Assignee: Zumtobel Aktiengesellschaft, Dornbirn, Austria

[21] Appl. No.: 928,285

[22] PCT Filed: Jan. 30, 1986

[86] PCT No.: PCT/EP86/00042
§ 371 Date: Oct. 2, 1986
§ 102(e) Date: Oct. 2, 1986

[87] PCT Pub. No.: WO86/04752
PCT Pub. Date: Aug. 14, 1986

[30] Foreign Application Priority Data
Feb. 4, 1985 [AT] Austria ................................. 304/85

[51] Int. Cl.[4] .................... H05B 37/02; H05B 39/04; H05B 41/36
[52] U.S. Cl. .................... 315/226; 315/283; 315/307; 315/244; 363/17; 363/58
[58] Field of Search ..................... 363/17, 58, 132; 315/176, 177, 308, 307, 224, 223, 243, 244, 226, 283

[56] References Cited
U.S. PATENT DOCUMENTS

| | | | |
|---|---|---|---|
| 3,969,652 | 7/1976 | Herzog | 315/308 |
| 3,999,100 | 12/1976 | Dendy et al. | 315/308 |
| 4,327,309 | 4/1982 | Wallot | 315/176 |
| 4,410,926 | 10/1983 | Hafner et al. | 363/58 |
| 4,511,823 | 4/1985 | Eaton et al. | 315/224 |
| 4,553,070 | 11/1985 | Sairanen et al. | 315/244 |
| 4,614,898 | 9/1986 | Itani et al. | 315/176 |

FOREIGN PATENT DOCUMENTS
2344171 10/1977 France.
A2071949 9/1981 United Kingdom.

OTHER PUBLICATIONS
"IEEE Transactions on Industrial Electronics", vol. IE-30, No. 1, Feb. 1983, New York, N.Y. U.S.A.: article by T. K. M. Babu et al., Evaluation of Single-Phase PWM Inverter Performance, p. 61, right column, paragraphs 1,2,5; FIG. 1.

Primary Examiner—Saxfield Chatmon
Attorney, Agent, or Firm—Toren, McGeady & Associates

[57] ABSTRACT

A circuit supplied with direct voltage serves for generation of voltages and/or currents of differing curve shape and differing frequency and/or differing polarity. A load L with ohmic, inductive, capacitive or complex resistance behavior is switched in series with a choke D. Furthermore, at least two controlled semiconductor switches $T_1$ and $T_2$ are provided, which are each, respectively in series, as far as the load L and the choke D are connected, but which, however, lie in current paths 1 and 2 which are connected at different potentials of the supply voltage. In operational use, the one switch $T_2$ is held open while the other switch $T_1$ is opened and closed in alternating sequence, and after termination of an adjustable and controllable time period, the switch $T_1$, which has been hitherto operated in alternating sequence, is now kept open, while the switch $T_2$, kept open hitherto, is now opened and closed in alternating sequence, and this alternating sequence of switch actuation is constantly repeated. These switches $T_1$ and $T_2$ can hereby be controlled by magnitudes inherent in the circuit or however also by magnitudes which act from the outside from the circuit (for instance computer control).

11 Claims, 7 Drawing Figures

CIRCUIT SUPPLIED WITH DIRECT VOLTAGE FOR GENERATING VOLTAGES AND/OR CURRENTS WITH DIFFERENT CURVE FORM AND/OR DIFFERENT FREQUENCY AND/OR DIFFERENT POLARITY WITH AT LEAST ONE LOAD

BACKGROUND OF THE INVENTION

1. Field of the Invention

The invention is directed to a circuit supplied with direct voltage for generating voltages and/or currents with different curve forms and/or different frequencies and/or different polarities, with at least one load.

2. Description of Related Art

In many technological and research fields, it is essential and important to have available voltages and currents which are controllable within wide limits, as far as their magnitude and their progression as a function of time is concerned. Without any claims of completeness, several application areas are enumerated here: regulation of DC current motors with reversible directions of rotation; regulation of alternating current motors as far as their rpm and directions of rotation are concerned; low frequency currents or voltages for research and investigation work, for instance in the biological field; direct current supplies for gas discharge lamps and their brightness regulation; testing of electrical apparatus with complex resistance behavior over wide frequency ranges and more of the same.

SUMMARY OF THE INVENTION

An object of the invention is to develop a circuit proceeding from a direct voltage supply, with which the solution of the task is possible. The invention is characterized by a choke coil arranged in series with this load and at least two controlled semiconductor switches, which each lie in a series circuit as far as the load and the choke coil are concerned. However, these two switches lie in different current paths and these current paths are connected at differing potentials of the supply voltage, wherein, in actual operation, one switch is held open while the other switch is opened and closed in alternating sequence, and, after the termination of an adjustable or selectable time period the switch which has hitherto been actuated in alternating sequence (clock pulse frequency) is kept open, while the hitherto held open switch is, in alternating sequence, opened and closed, this alternating sequence of switch actuation (polarity reversal frequency) being continuously repeated. With such a circuit according to the invention, voltages and currents of whatever progression can be produced at a load. The respective continuous on and off switching of one of the semiconductor switches provided in pairs is designated as the clock pulse frequency herein while the alternating sequence of putting into operation of the two semiconductor switches provided in pairs is designated as the polarity reversal frequency.

A particularly simple circuit of this type is characterized in accordance with a feature of the invention by the current path containing the load and the choke in series arrangement being connected at an average value of the supply voltage. With such a circuit, currents and voltages of very low frequency (lower than 20 Hertz) can be obtained without requiring any particular switching complications, however the output which can be handled by this circuit is limited.

An additional circuit of this type also suitable for low outputs and particularly low frequencies is characterized, in accordance with an additional feature of the invention, by the current path containing the load and the choke in series arrangement being connected at different potentials of the supply voltage through at least two condensers, which each lie in series, as far as the load and the choke coil are concerned, but which, however, lie in different current paths, wherein the condensers are connected at the same potentials of the supply voltage as the controlled semiconductor switches.

Another circuit, which satisfies all requirements as far as the output and variation possibilities are concerned, is characterized, in accordance with an additional feature of the invention, in that the current path containing the load and the choke in series arrangement is connected at differing potentials of the supply voltage through two additional controllable semiconductor switches, which each lie in series arrangement with respect to the load and the choke coil, but which, however, lie in different current paths, wherein these additional semiconductor switches are opened or closed in the period of the polarity reversal frequency of the other semiconductor switches and thus form, respectively, a closed current circuit in connection with the load and the choke coil, in which the direction of the current flow changes in accordance with the polarity reversal frequency.

If a condenser is connected in parallel with a load, then the current and/or the voltage is smoothed out; a similar effect is achieved if a condenser is connected between the choke and the load whose other electrode is connected with the connection point for the supply of voltage which exhibits the lower voltage of the two connection points of this supply voltage.

There are semiconductor switches into which recovery diodes are integrated; if however semiconductor switches are utilized for the circuit in accordance with the invention into which no such recovery diodes are integrated, it is then provided according to a further feature of the invention, that at least one recovery diode is arranged in parallel with each of the semiconductor switches which are periodically actuated in alternating sequence (clock pulse frequency). This measure prevents that the load current is interrupted during polarity reversal of the cyclically actuated semiconductor switches arranged in pairs.

The magnitude of the ratio of the polarity reversal frequency to the clock pulse frequency or timing frequency determines the regulation quality of the circuit; the larger this ratio is, the smaller the choke can be made. It is therefore desirable to arrange this ratio at approximately 1:1000, or preferably even higher.

BRIEF DESCRIPTION OF THE DRAWINGS

The invention is described with particularity with the help of the drawings, in which.

DESCRIPTION OF THE PREFERRED EMBODIMENTS

Figure 1:
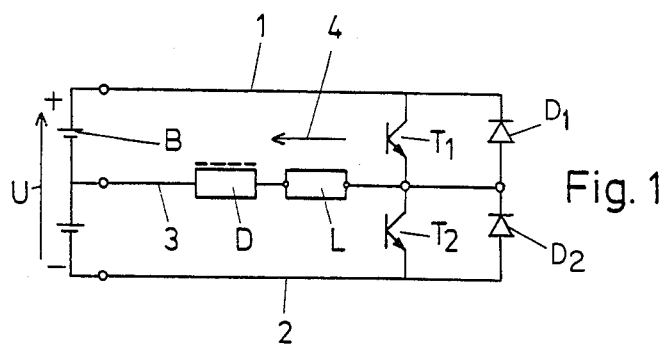
FIG. 1, FIG. 2 and FIG. 3 show three different embodiments of the invention.

FIG. 1 illustrates a first embodiment example of a circuit according to the invention. A battery B with a central tap and with the terminal voltage U serves here as a voltage source. The line branch 3, comprising a choke D and a load L in series, is, on the one hand, connected to the central tap of the battery B, and, on the other hand, between two control semiconductor switches $T_1$ and $T_2$, of which each is connected with one respective terminal of the battery B so that each semiconductor switch lies in a series circuit with the choke D and the load L. The control of the semiconductor switches $T_1$ and $T_2$ is additionally explained in detail in the following. For the time being, it has to be stated that during the first time period in a first mode, the semiconductor switch $T_1$ is cyclically continuously opened and closed (clock pulse frequency) and during this time period, the other semiconductor switch $T_2$ is kept open. This continuous opening and closing of the one switch, while the other switch is open, is here and in what follows designated as clock pulse frequency. After termination of this first time period, in a second mode, the switch $T_1$ is held open, wherein now the other switch $T_2$ is continuously opened and closed. These modes are actuated cyclically. This change in the actuation of the switches $T_1$ and $T_2$ is here and in the following designated as polarity reversal frequency. This process can now be repeated as often as desired. While the one semiconductor switch $T_1$ is actuated cyclically, current flows in the one direction (arrow 4) through the load L. While the semiconductor switch $T_2$ is operated cyclically, the current flows in the opposite direction through the load L. The magnitude of the load current depends now, on the one hand, on the inductance of the choke and the clock pulse frequency of the switches $T_1$ and $T_2$; the time period of current flow in, respectively, one direction depends on the polarity reversal frequency. The clock pulse frequency as well as the polarity reversal frequency are controllable by different magnitudes, which will be additionally dealt with in the following.

Figure 2:
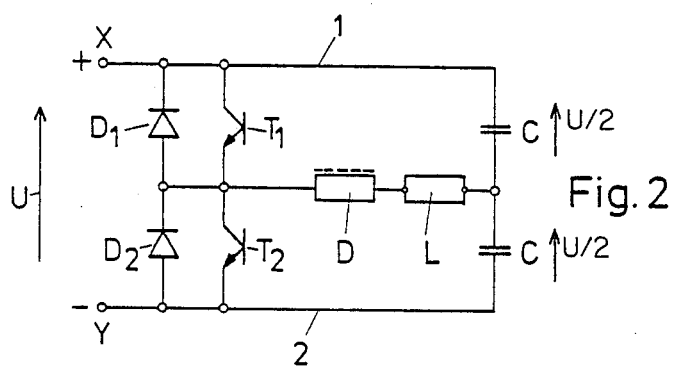

An additional circuit with which, in particular, low frequency voltages or currents starting from a direct voltage can be obtained is shown in FIG. 2. The voltage U is applied to the terminals XY of the circuit, recovery diodes $D_1$ and $D_2$ are provided in parallel to the semiconductor switches $T_1$ and $T_2$. One condenser C each is arranged in series with the load L and the choke D in different current circuits, so that the current path comprising the load and the choke in series is connected at different potentials of the supply voltage through the two condensers, which each are in series as far as the load and the choke are concerned, but, however, which lie in different current paths, wherein the condensers C are connected to the same potentials of the supply voltage U as the controlled semiconductor switches $T_1$ and $T_2$. In this circuit also the controlled semiconductor switches $T_1$ and $T_2$ are actuated in the sense of the clock pulse frequency and the polarity reversal frequency mentioned above. The frequency of the voltage existing at the load L is herein dependent, among other things, on the capacity and the time constant of the condensers.

Figure 3:
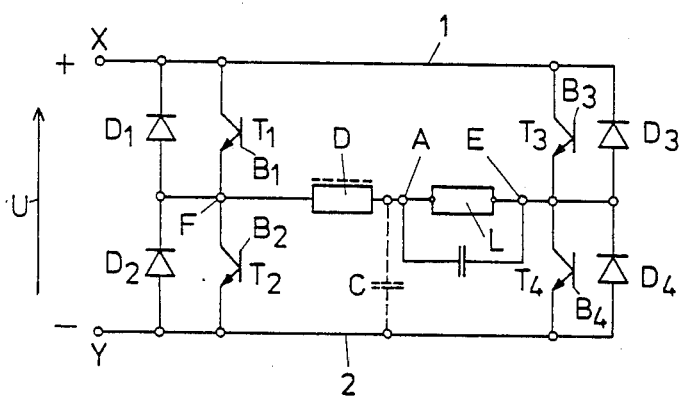

A circuit which can satisfy all the requirements, and which constitute a direct refinement of the previously explained circuits, is now shown in FIG. 3.

This circuit, supplied with constant voltage, is designed as a bridge circuit. In each outer branch of this bridge voltage a transistor $T_1$ to $T_4$ is arranged. Two of these transistors, namely the transistors $T_1$ and $T_2$ which lie between the connecting points X and Y for the supply voltage U, comprises recovery diodes $D_1$ and $D_2$ arranged in parallel to said transistors. Diodes $D_3$ and $R_4$ are arranged in parallel with the other two transistors $T_3$ and $T_4$, for purposes of protection. The bases $B_1$ to $B_4$ of the transistors $T_1$ to $T_4$ are, for instance, connected with integrated circuits, which, however, are not shown here. The load L is connected at the terminals A and E in the diagonal branch of the bridge circuit. Here also ohmic, inductive and capacitive resistances can be used as a load, but also such which exhibit a complex resistance behavior. The choke D is connected between the terminal A and the point of connection F between the two transistors $T_1$ and $T_2$ serving as semiconductor switches. Additionally there is a condenser C provided here in parallel to the load. Another condenser C may be provided instead of the condenser parallel with the load L, whose one electrode lies between the load L and the choke D and whose other electrode lies at the point of connection Y for the supply voltage U, which point of connection exhibits the lower potential. This is indicated in FIG. 3 with a broken line. In industrial operation use of the circuit, the transistors $T_1$ and $T_2$, serving as semiconductor switches, are actuated in the sense of the clock pulse frequency and polarity reversal frequency described above. Contrary to that, the transistors $T_3$ and $T_4$, serving as semiconductor switches, are correspondingly switched only in accordance with the polarity reversal frequency.

Figure 6:
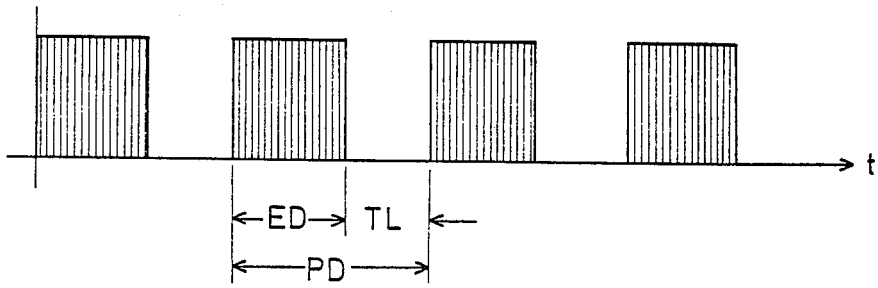
FIG. 6 shows a pulse diagram for the cycle control of the semiconductor switches.

FIG. 6 illustrates a pulse sequence with which the bases of the transistors $T_1$ and $T_2$ can be controlled. Here PD signifies the duration of the period; ED the duration of the duty cycle (pulse length) and TL the time interval between pulses. The ratio between the duty cycle ED and the periodic cycle PD is designated as the pulse duty factor. This pulse duty factor is adjustable and changeable with the integrated circuit not shown here but which has been mentioned by way of an example.

The circuit in FIG. 3, explained above as far as its basic structure is concerned, is now to be used for operating a gas discharge lamp supplied with direct voltage, which has been symbolized in FIG. 3 by the load L. Operation of a gas discharge lamp with direct voltage is to be preferred to operating it with alternating voltage, since in that case the gas discharge lamp flickers less and has a higher light output. The only disadvantage is that during continuous operation with direct voltage deposits accumulate in the electrode area of the gas discharge lamp caused by the flow of ions which is always in the same direction. In order to avoid these deposits the lamp is repeatedly reversed in polarity, for which purpose up to now mechanical switches have been used. With the help of the described circuit this now occurs, in detail, by way of electronic operation, as follows:

The direct voltage U being applied to the terminals X, Y can either be drawn from a power supply source, it can however also be made available by a converter (alternating current/direct current converter). The transistors $T_1$ to $T_4$ serve as electronic switches and their bases are controlled by the magnitude of the operating current through pulse sequences according to FIG. 6. In the first phase of the operation the transistors $T_1$ and $T_4$ are closed and the transistors $T_2$ and $T_3$, on the other hand, are held open. In addition to the transistor $T_1$ or its basis $B_1$ is herein controlled by the pulse sequence shown in FIG. 6. During the duty cycle ED of a pulse, the transistor $T_1$ is closed and direct current flows from the terminal X through the transistor $T_1$, the choke D and the lamp L through the transistor $T_4$ which is held closed during this operational phase, to the terminal Y. Prior to reaching the rated magnitude of the lamp operating current, that is—viewed timewise—at the end of the duty cycle ED of the control pulse, the transistor $T_1$ opens, the current flow from the power supply source is interrupted and the magnetic energy built up in the choke D by the current flow is now converted into electrical energy and supplies an opposing voltage, which maintains the current flow through the lamp L in the same direction up to the start of the duty cycle time of the next control pulse, meaning that during the interval TL between duty cycles, in the course of which, the energy stored in the choke is used up. Now the transistor $T_1$ is again switched on by the next following control pulse at the base $B_1$ of the transistor $T_1$, the transistor $T_1$ being again closed and therein new energy and current is supplied from the power source to the circuit in the manner described, up to shortly before reaching the rated magnitude of the lamp operational current, whereupon the mentioned switch-over process is again initiated and performed. During this time, current always flows in the same direction through the lamp L. The control processes described are very short and occur in fractions of seconds. During this first phase, while the transistor $T_1$ is continuously cyclically opened and closed, the transistor $T_4$ remains closed. In order to avoid the mentioned damaging deposits because of direct voltage operation of the gas discharge lamp, after a certain time, the polarity of the lamp L is changed. This occurs by opening the transistors $T_1$ and $T_4$, closing the transistor $T_3$ and the transistor $T_2$ is now cyclically controlled through its base $B_2$ as it has been described in connection with transistor $T_1$. The current flow in the lamp is thereby reversed. If a gas discharge lamp is used as load L, one can eliminate the condenser C in the type of operation described here.

If the periodic duration PD of the control pulse (clock pulse frequency) depends on the time constant of the choke D, then the polarity reversal frequency can, for instance, be derived and controlled from the power source frequency, if the direct voltage at the terminals XY of the circuit is obtained by an alternating current—direct current converter (not shown). Also, other control frequencies for the polarity reversal can be utilized with success. The duration of the period of the polarity reversal frequency is therein always greater than the duration of the period of the control pulses (clock pulse frequency). If the diodes $D_1$ and $D_2$ connected in parallel with transistors $T_1$ and $T_2$ serve as recovery diodes which maintain the current flow when the transistors $T_1$ and $T_2$ open and close controlled by the pulses, then the diodes $D_3$ and $D_4$ in parallel with the transistor $T_3$ and $T_4$ fulfill a protective function.

Figure 7:
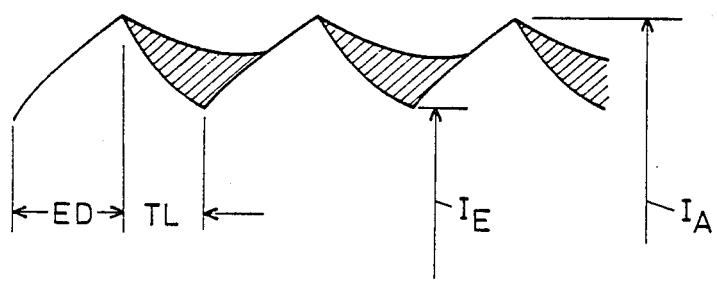
FIG. 7 shows a detail from the current flow diagram according to FIG. 5 at a greatly magnified scale.

The current flow through the gas discharge lamp L in accordance with the circuit in FIG. 3 and the type of operation described above is depicted schematically in FIG. 5. Viewed overall, we are dealing here with a trapezoid-shaped progression with changing plus or minus signs. The period P of the sequence depends on the polarity change frequency. If the current flow, shown in the illustration with a straight line, is, so to speak, represented in a magnified manner, then there results a line which is shown in FIG. 7 and which represents the segments G encircled in the FIG. 5, so to speak, at a larger scale. This line extends in a jagged manner, its rise or fall is determined by the resistance behavior of the choke D and the load L, its reversal points depending on the clock pulse frequency and its smoothness (shaded areas) is determined by the smoothing-out condensers C according to the circuit in FIG. 3.

Figure 4:
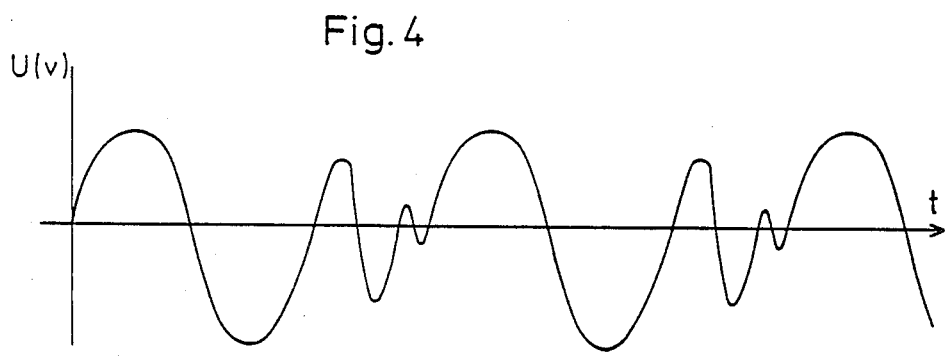
FIG. 4 and FIG. 5 show voltage- or current flow diagrams.
Figure 5:
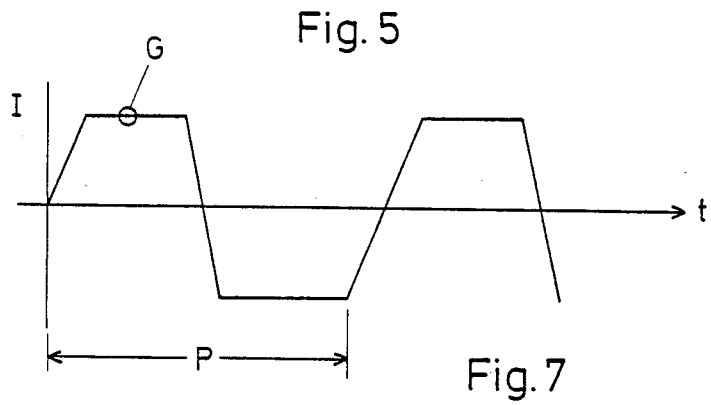

Instead of the current flow, as it is snown in FIG. 5, a voltage progression can, for instance, also be forced as it is illustrated in FIG. 4.

For controlling the clock pulse frequency or the polarity reversal frequency, electrical magnitudes inherent in the circuit can be utilized; these are thus magnitudes which can for instance be measured at the load L, such as voltage, voltage rise, current current rise, effective- or apparent load. In the embodiment example explained above in connection with FIG. 3, the load current was utilized for controlling the clock pulse frequency for the semiconductor switches $T_1$ and $T_4$, meaning the semiconductor switches $T_1$ and $T_4$ were cyclically opened, respectively, before the load current, had reached the lamp rated current and they were again switched back into the circuit as soon as the load current had somewhat diminished. The current values at which switching on or switching off occurred are designated in the illustration in FIG. 7 with $I_E$ or $I_4$. The polarity reversal frequency (P—FIG. 5) was derived from the frequency of a conventional alternating current voltage supply network with 50 Hertz. A control by a magnitude not depending upon the circuit in this case the line frequency of an alternating current voltage supply network is designated as external excitation.

In the circuit in FIG. 2, on the other hand, the polarity reversal frequency can be controlled by the voltage rise at the condensers C (natural frequency). Other control possibilities for the cycling frequency result from the selection of the ratio of the switch on duration ED to the switch off duration TL or, however, through changing the pulse duration PD (pulse width modulation). Programmable processes are appropriately utilized for controlling the clock pulse frequency, with the help of which regulation curves and control curves of any desired shape can be obtained. If previously the operation of the gas discharge lamp L has been explained with particularity with the help of FIG. 3, then it has to be mentioned at this time, that also other apparatus and devices can be used by way of a load. For instance, an alternating current, motor which can be supplied with alternating current voltage changing as far as its frequency and magnitude is concerned, can be used in order to regulate rpm and torque of the motor within wide limits.

Reverting to the embodiment example in FIG. 3 and the operation of a gas discharge lamp L with the circuit shown here, it has to be additionally mentioned, by way of a supplement: it is achieved by changing the polarity of the switches $T_1$ and $T_2$ or $T_3$ and $T_4$ that current flows through the lamp in changing sequence and in changing direction depending on the polarity reversal frequency of the switches, so that the undesirable deposits at the electrodes can be prevented. The brightness of these lamps can be regulated also in a simple manner with the mentioned circuit, by, for instance, shortening the switch on duration ED of the control pulse for the cyclic control of the semiconductor switches.

It is possible to control and regulate the clock pulse frequency and/or the polarity reversal frequency by magnitudes entirely independent of the circuit. Processors serve for this purpose which can be programmed as desired so that control curves of the most diverse shapes can be obtained. This can be carried so far that the clock pulse frequency exhibits a non-periodic behavior, this also applies to the polarity reversal frequency provided both are controlled and influenced by magnitudes independent of the circuit therefor from the outside.

I claim:

1. A ballast circuit for operating a gas discharge lamp with direct current, comprising:
   a load including at least one gas discharge lamp;
   a choke coil in series with said load;
   a power source for providing a direct current supply voltage having a positive and a negative potential;
   at least two controlled semiconductor switches connected, respectively, in series between the series of said choke coil and said load, and the positive ane negative potentials of said supply voltage forming two different conducting paths;
   at least two free-wheeling diodes connected in parallel with said two controlled semiconductor switches, respectively;
   means for controlling said two controlled semiconductor switches, wherein in a first mode, one of said semiconductor switches is held open while the other of said semiconductor switches is repetitively opened and closed in alternating sequence at a first predetermined frequency, and, in a second mode, said other semiconductor switch is held open while said one semiconductor switch is repetitively opened and closed in alternating sequence at said first predetermined frequency, and wherein said two controlled semiconductor switches are operated repetitively in said first and second modes in alternating sequence at a second predetermined frequency, in which a ratio of said second predetermined frequency to said first predetermined frequency is substantially 1:1000.

2. A ballast circuit according to claim 1, characterized in that the series of the gas discharge lamp and the choke is connected to a mid-value of the supply voltage.

3. A ballast circuit according to claim 1, characterized in that the series of the gas discharge lamp and the choke is connected at differing potentials of the supply voltage through at least two condensers, which lie in series with the gas discharge lamp and the choke coil in said two different conducting paths, respectively, wherein the condensers are connected at the same respective potentials of the supply voltage as the controlled semiconductor switches.

4. A ballast circuit according to claim 1, characterized in that the series of the gas discharge lamp and the choke is connected at differing potentials of the supply voltage through two additional controllable semiconductor switches which each lie in series with the gas discharge lamp and the choke coil in said two different conducting paths, respectively, wherein these additional semiconductor switches are alternately opened and closed at said second predetermined frequency in synchronization with said two semiconductor switches, thus respectively forming a closed circuit in combination with the gas discharge lamp and the choke coil, in which circuit a direction of a current flow changes corresponding to the second predetermined frequency.

5. A ballast circuit according to claim 1, 2, 3 or 4, characterized in that a condenser is connected in parallel with the gas discharge lamp.

6. A ballast circuit according to claim 1, 2, 3 or 4, characterized in that a condenser is connect between a junction of the choke and the gas discharge lamp and the negative potential of the supply voltage.

7. A ballast circuit according to claim 1, characterized in that the second predetermined frequency is determined by the magnitude and/or the rise of the charging voltage of a condenser lying in series with the gas discharge lamp.

8. A ballast circuit according to claim 1, characterized in that the second predetermined frequency is determined by magnitudes independent of the circuit and is derived from a frequency of an alternating current voltage supply network.

9. A ballast circuit according to claim 1, 2, 3 or 4, characterized in that a ratio of a switch on duration to a switch off duration per period of the respective semiconductor switches at the first predetermined frequency serves for regulation of the voltage applied to the gas discharge lamp and/or of the current flowing through the gas discharge lamp.

10. A ballast circuit according to claim 5, characterized in that a ratio of a switch on duration to a switch off duration per period of the respective semiconductor switches at the first predetermined frequency serves for regulation of the voltage applied to the gas discharge lamp and/or of the current flowing through the gas discharge lamp.

11. A ballast circuit according to claim 6, characterized in that a ratio of a switch on duration to a switch off duration per period of the respective semiconductor switches at the first predetermined frequency serves for regulation of the voltage applied to the gas discharge lamp and/or of the current flowing through the gas discharge lamp.

* * * * *